(12) United States Patent
Sridhar

(10) Patent No.: US 8,792,355 B2
(45) Date of Patent: Jul. 29, 2014

(54) ADJUSTMENT OF RADIO RESOURCE CONTROL STATE TIMERS IN A RADIO ACCESS NETWORK

(75) Inventor: Kamakshi Sridhar, Plano, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 247 days.

(21) Appl. No.: 13/228,808

(22) Filed: Sep. 9, 2011

(65) Prior Publication Data
US 2013/0064107 A1 Mar. 14, 2013

(51) Int. Cl.
*H04L 12/26* (2006.01)

(52) U.S. Cl.
USPC ........................................ 370/236.1

(58) Field of Classification Search
None
See application file for complete search history.

(56) References Cited

U.S. PATENT DOCUMENTS

2003/0095538 A1* 5/2003 Kayama et al. ............... 370/350
2009/0285196 A1* 11/2009 Lee et al. ...................... 370/345

* cited by examiner

Primary Examiner — Minh-Trang Nguyen
(74) Attorney, Agent, or Firm — Duft Bornsen & Fettig, LLP

(57) ABSTRACT

Systems and methods are provided for adjusting Radio Resource Control (RRC) timers in a Radio Access Network (RAN). The system manages radio communications between a mobile device and a base station, and further transitions the mobile device between Radio Resource Control (RRC) states based upon application-layer data traffic for the mobile device and a timer value. Additionally, the system determines an overhead load based on network-layer signaling events associated with at least one RRC transition for the mobile device, and determines a bearer load based on the application-layer data traffic for the mobile device. Based upon the overhead load and the bearer load, the system adjusts the timer value.

20 Claims, 4 Drawing Sheets

US 8,792,355 B2

ADJUSTMENT OF RADIO RESOURCE CONTROL STATE TIMERS IN A RADIO ACCESS NETWORK

FIELD OF THE INVENTION

The invention relates to the field of wireless communications, and in particular, to wireless signaling traffic management.

BACKGROUND

In wireless networks, and in particular, 3rd Generation mobile telecommunications (3G) networks, traffic between mobile devices and a Radio Access Network (RAN) is highly coordinated in order to ensure that resources are utilized efficiently. For example, mobile devices communicating with RANs are typically regulated into a number of Radio Resource Control (RRC) states, where each RRC state is associated with a different capacity for data transmission and receipt. For example, one RRC state may provide a dedicated communication channel to a mobile device over the radio (i.e., an air interface), while another RRC state may substantially disconnect the mobile device from the RAN. In order to assure that mobile devices do not over-utilize scarce radio bandwidth of the RAN, the RAN typically includes a set of timers. If the mobile device is inactive for a greater period than the timer value, the RAN may transition the mobile device to a less active RRC state. This is generally beneficial because the mobile device will not waste radio bandwidth idling in between transmissions.

SUMMARY

The very process of transitioning the RRC state of a mobile device results in signaling events which themselves take up valuable radio bandwidth. Furthermore, transitions between RRC states may result in a processing load upon the Radio Network Controller (RNC) that serves the RAN. If timer values are too low, then network-layer RRC transition signaling will constitute an undesirable fraction of radio communications and will increase network load, reducing the amount of application-layer traffic that may be transmitted. By the same token, if timer values are too high, then available radio resources may be diminished, reducing the overall performance of the network. Adding to this problem, the relationship between network layer RRC transitions and application layer traffic for the mobile device may vary based upon the time of day, and may also vary based upon the type of application used by the mobile device. For example, e-mail applications may generate relatively little application layer traffic, while video applications may generate a great deal of application layer traffic. Thus, it remains important to carefully set timer values for mobile devices attempting to access the RAN.

Embodiments described herein provide systems capable of adjusting timers used to manage Radio Resource Control (RRC) states for mobile devices. By dynamically changing the timer values based upon network layer RRC transition signaling and also upon application layer traffic for the mobile device, a Radio Access Network (RAN) is capable of adjusting how RRC states change within the network in order to address varying loads that occur over time for that network.

One embodiment is a system comprising a controller and a network monitor. The controller is operable to manage radio communications between a mobile device and a base station, and is further operable to transition the mobile device between Radio Resource Control (RRC) states based upon application-layer data traffic for the mobile device and a timer value. The network monitor is operable to determine an overhead load based on network-layer signaling events associated with at least one RRC transition for the mobile device, and to determine a bearer load based on application-layer data traffic for the mobile device. The controller is further operable to adjust the timer value based upon the overhead load and the bearer load.

Another embodiment is a method. The method comprises managing radio communications between a mobile device and a base station, including transitioning the mobile device between Radio Resource Control (RRC) states based upon application-layer data traffic for the mobile device and a timer value. The method further includes determining an overhead load based on network-layer signaling events associated with at least one RRC transition for the mobile device, and determining a bearer load based on application-layer data traffic for the mobile device. Further, the method includes generating an instruction to adjust the timer value based upon the overhead load and the bearer load, and transmitting the instruction to a network device.

A further embodiment is a non-transitory computer readable medium embodying programmed instructions which, when executed by a processor, are operable for performing a method. The method comprises managing radio communications between a mobile device and a base station, including transitioning the mobile device between Radio Resource Control (RRC) states based upon application-layer data traffic for the mobile device and a timer value. The method further includes determining an overhead load based on network-layer signaling events associated with at least one RRC transition for the mobile device, and determining a bearer load based on application-layer data traffic for the mobile device. Further, the method includes generating an instruction to adjust the timer value based upon the overhead load and the bearer load, and transmitting the instruction to a network device.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
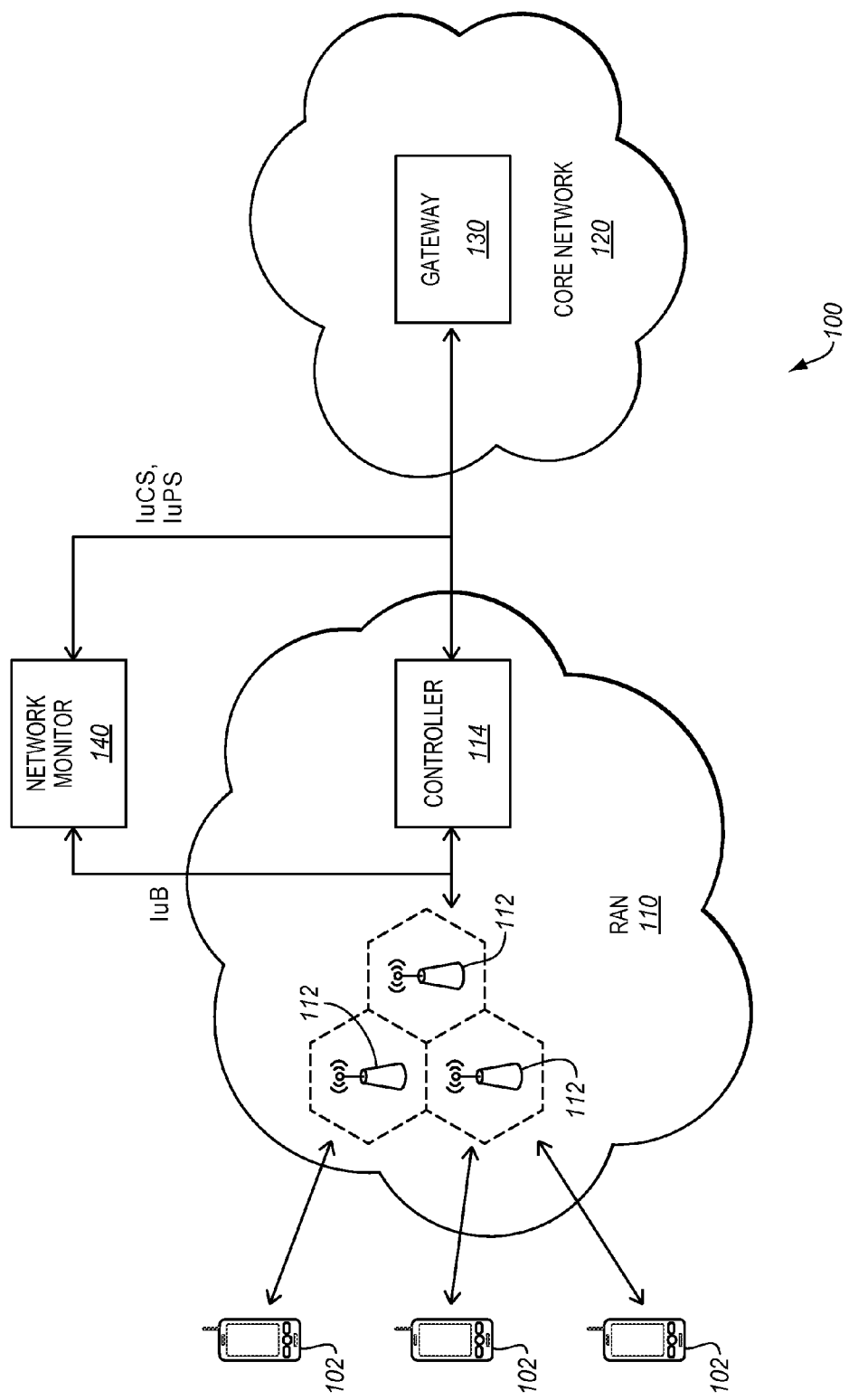
FIG. 1 is a block diagram illustrating a network architecture for an exemplary embodiment.

FIG. 1 is a block diagram illustrating a network architecture 100 for an exemplary embodiment. In this embodiment, network architecture 100 comprises Radio Access Network (RAN) 110 in communication with core network 120. RAN 110 comprises multiple base stations 112 in communication with one or more controllers 114. Base stations 112 may comprise any devices or systems capable of creating and maintaining a radio air interface with one or more mobile devices 102. For example, in a 3rd Generation mobile telecommunications (3G) network utilizing a Universal Mobile Telecommunications System (UMTS) Wideband Code Division Multiple Access (WCDMA) RAN, base stations 112 may each comprise a Node B. Base stations 112 may be physically integrated with controller 114, or may be independent devices. Controller 114 is operable to manage communications from mobile devices 102 that are directed to core network 120 via base stations 112. Controller 114 may comprise, for example, a Radio Network Controller (RNC). In this embodiment, RAN 110 facilitates communications between mobile devices 102 and core network 120 via gateway 130. Gateway 130 may include systems for performing Mobile Switching Center (MSC) functions, and may further include systems for performing General Packet Radio Service (GPRS) gateway support node and/or serving support node functions for core network 120. Core network 120 comprises any system of computing and/or routing components operable to provide services requested by mobile devices 102. Mobile devices 102 may comprise any portable device capable of wireless radio communications (e.g., tablets, laptops, mobile phones, smart phones, etc.). While specific examples herein may discuss elements of a WCDMA network, other embodiments may utilize, for example, Long Term Evolution (LTE), Code Division Multiple Access (CDMA), Institute of Electrical and Electronics Engineers (IEEE) 802.11b/g/n, IEEE 802.16, and/or other networking technologies and standards. For example, controller 114 may be functionally integrated with base station 112 to form an eNodeB in an LTE network, controller 114 may be implemented as a Wireless Access Point (WAP) in an IEEE 802.11b/g/n network, etc.

According to FIG. 1, communications at RAN 110 may be measured and reviewed by network monitor 140. For example, in a UMTS Terrestrial Radio Access Network (UTRAN), network monitor 140 may review information transmitted over a logical interface between a Node B and an RNC (this interface is known as an IuB interface). Network monitor 140 may further review information transmitted from gateway 130 to controller 114 via a logical interface (e.g., an IuCS or IuPS interface). Note that while network monitor 140 is illustrated as a separate component from controller 114 in FIG. 1, in some embodiments network monitor 140 and controller 114 are implemented as functional elements of the same component. Utilizing network monitor 140, RAN 110 receives feedback describing the amount and type of radio traffic at RAN 110. Network monitor 140 may examine the amount of resources used at the network layer (e.g., layer three of the Open Standards Interconnection (OSI) model) to set up or tear down a communication channel with a mobile device 102. For example, network monitor 140 may determine the amount of network resources used to manage RRC state transitions. RRC state transitions managed at the network layer may be considered "overhead load," because signaling for RRC state transitions is used to set up and tear down a communication channel for payload data for a mobile device 102. Thus, the network layer signaling is a prerequisite to engaging in application layer communications with devices available via the core network. In addition to monitoring network layer traffic, network monitor 140 may determine the amount of resources used for the transmission of application layer data traffic (e.g., layer seven of the OSI model, the application layer of the Internet model, etc.). Application layer data traffic comprises actual payload or content that a given mobile device 102 will receive from or transmit to an element of core network 120. As the application layer exists on top of the network layer, it is not used to set up or tear down a communication channel. This application layer data traffic may be used to determine a "bearer load." Based upon the bearer load and overhead load, controller 114 may change timer parameters for RRC states on the fly, allowing RAN 110 to adapt to usage of wireless resources on the network.

Timers for RRC state transitions will be described in greater detail with regard to FIG. 2. Assume, for this embodiment, that a total of four potential RRC states are available to mobile devices 102 within range of RAN 110.

Figure 2:
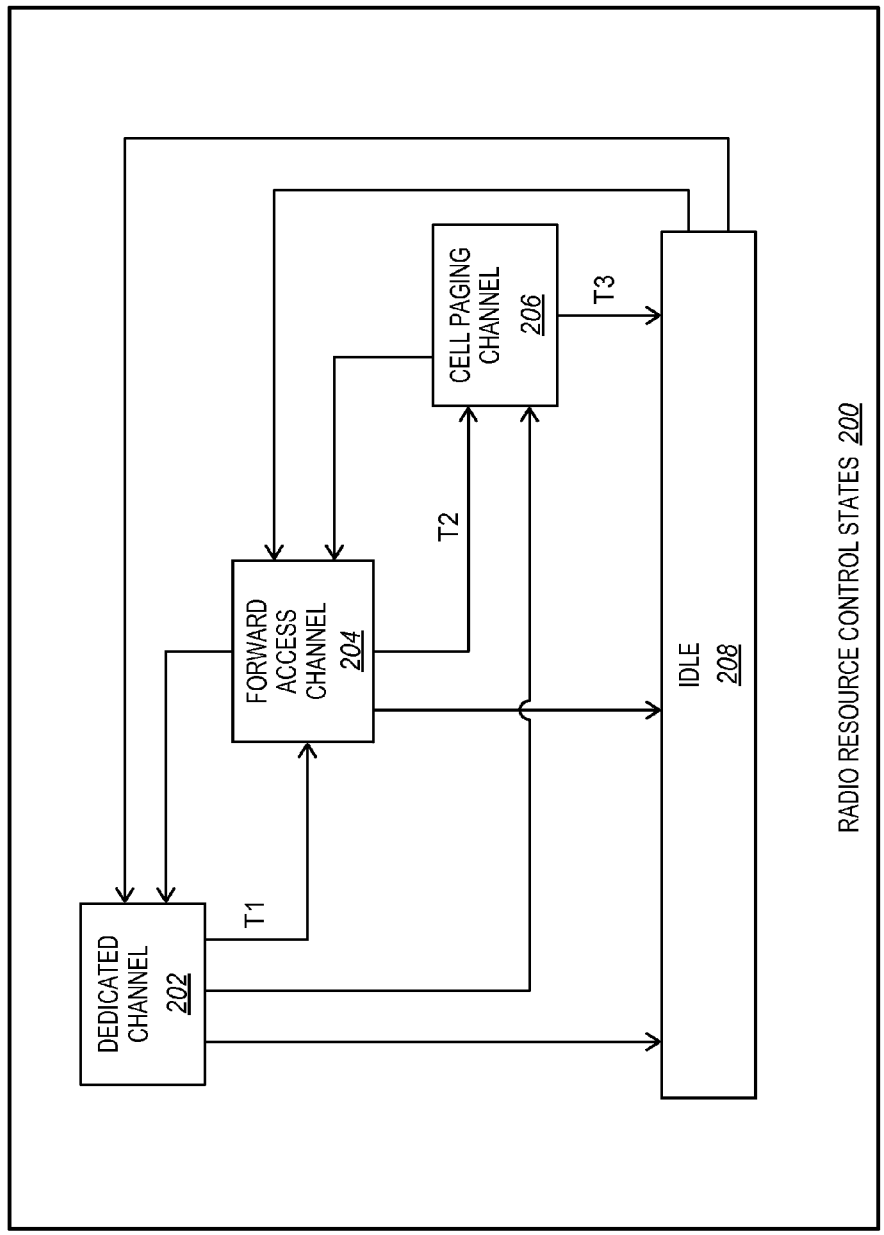
FIG. 2 is a block diagram illustrating state transitions to and from different Radio Resource Control (RRC) states for an exemplary embodiment

FIG. 2 is a block diagram illustrating state transitions to and from different Radio Resource Control (RRC) states for an exemplary embodiment. According to FIG. 2, the available RRC states include a state for a dedicated channel 202 (e.g., the CELL_DCH state of the UMTS WCDMA protocol), a state for a forward access channel 204 (e.g., the CELL_FACH state of the UMTS WCDMA protocol), a state for a cell paging channel 206 (e.g., the CELL_PCH state of the UMTS WCDMA protocol), and an idle state 208. A dedicated channel 202 is typically a dedicated physical channel, establishing both an uplink and a downlink for a mobile device over an air interface. While dedicated channel 202 may be a time or frequency multiplexed channel, dedicated channel 202 is characterized in that it is exclusive to a single mobile device. In contrast, forward access channel 204 is shared by multiple mobile devices. The mobile devices each monitor forward access channel 204 in case a downlink is desired, and the mobile devices utilize a default common or shared transport layer for uplink operations. Cell paging channel 206 is characterized in that no uplink activity is available for the mobile device. Instead, the mobile device monitors a paging channel to determine if downlink traffic is incoming and directed to the mobile device. Upon determining that downlink traffic is directed to the mobile device, the mobile device may negotiate with a base station in order to move to a more active RRC state and receive the downlink traffic. Idle state 208 is characterized in that the mobile device does not interact with the RAN.

Certain state transitions are allowed in this embodiment, and are indicated by the arrows at FIG. 2. Each state transition may be triggered by any number of criteria. However, typically the state transitions indicated by T1, T2, and T3 are triggered whenever communications with a mobile device have remained idle for a certain period of time. Thus, the mobile device may be downgraded to a less active RRC state based upon one or more idle timers. In particular, it may be the idling of application layer data traffic that starts the timers running. Furthermore, the idle timer value for each of the state transitions indicated by T1, T2, and T3 may be different. Network architecture 100 of FIG. 1 is operable to alter the timer values for each of the RRC state transitions T1, T2, and T3, thereby changing the way in which traffic is managed at the network.

Further details of the operation of network architecture 100 will be discussed with regard to FIG. 3. Assume, for this embodiment, that a mobile device 102 has initiated communications with RAN 110. Further, assume that RAN 110 transitions mobile device 102 between RRC states, based upon whether communications for mobile device 102 have remained idle beyond a certain timer value.

Figure 3:
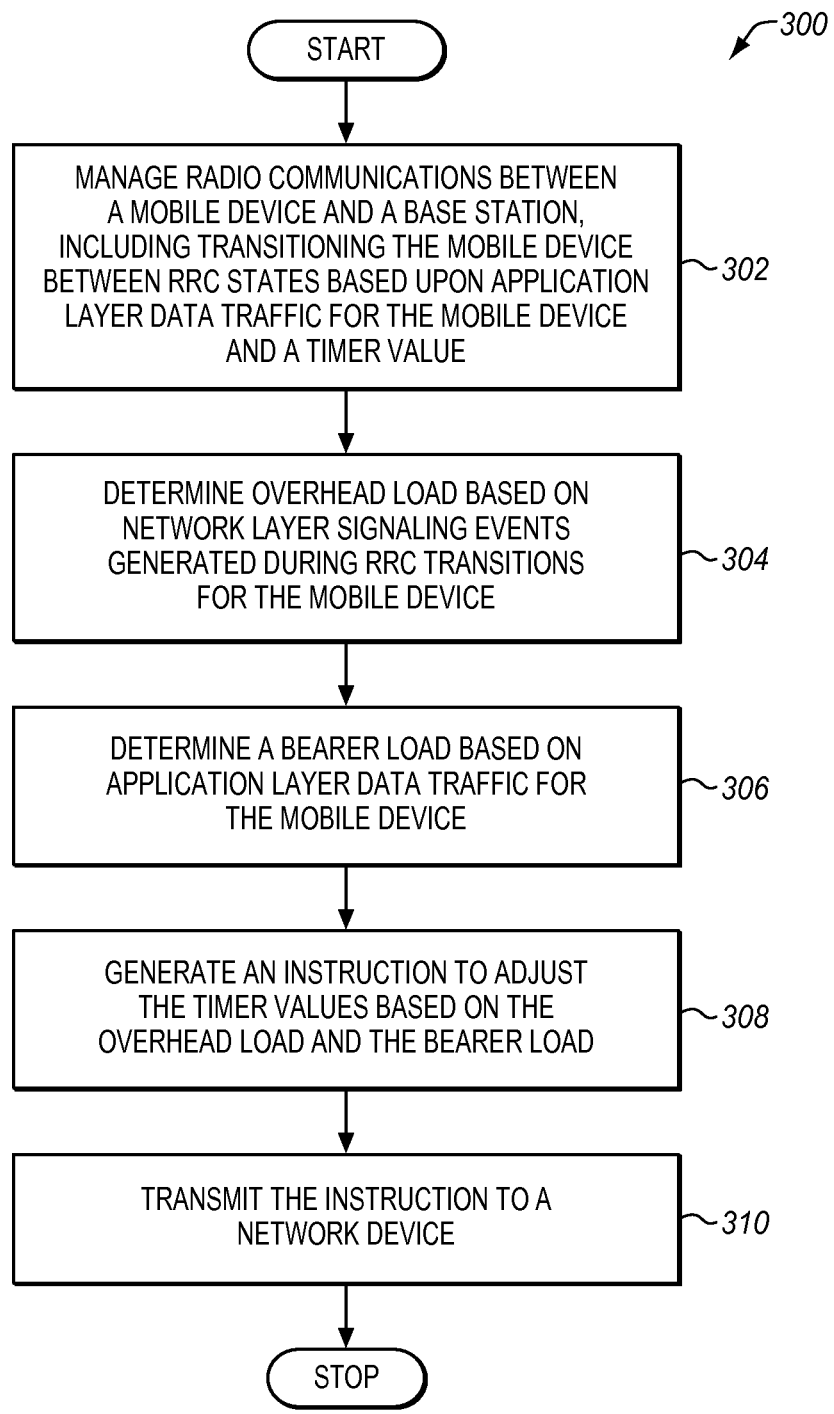
FIG. 3 is a flowchart illustrating a method for adjusting RRC timer for an exemplary embodiment.

FIG. 3 is a flowchart illustrating a method 300 for adjusting RRC timer values for an exemplary embodiment. The steps of method 300 are described with reference to network architecture 100 of FIG. 1, but those skilled in the art will appreciate that method 300 may be performed in other systems. The steps of the flowcharts described herein are not all inclusive and may include other steps not shown. The steps described herein may also be performed in an alternative order. In step 302, controller 114 manages radio communications between mobile device 102 and base station 112. This management includes transitioning mobile device 102 between RRC states based upon data traffic for the mobile device and a timer value. Data traffic may be thought of as the data payload for mobile device 102 (e.g., the data that a user of mobile device 102 wishes to see or use). This traffic includes any data that is used by mobile device 102 for purposes other than setting up or tearing down a communication channel for mobile device 102. For example, the data traffic includes application layer data traffic for the mobile device. This application-layer data traffic sits atop network layer communication channels. If data traffic for mobile device 102 has dropped below a certain threshold for a period of time longer than the timer value, controller 114 may downgrade the RRC state of mobile device 102 in order to free up air interface resources of RAN 110 for other mobile devices 102. Conversely, if mobile device 102 is about to receive or transmit a large amount of data traffic, controller 114 may direct base station 112 to move mobile device 102 to a more active RRC state in order to allow for the transmission of data.

In step 304 of FIG. 3, network monitor 140 determines an overhead load based on network layer signaling events generated for RRC transitions for the mobile device. For example, network monitor 140 may determine the overhead load by measuring the load for a single mobile device 102, or may measure the overhead load for a large number of mobile devices 102 in aggregate. Overhead load indicates the amount of network resources that are used to set up and tear down communication channels at the network layer (i.e., the network layer communications set up channels that enable the transmission and receipt of data traffic that occurs on other layers). This overhead signaling does not include data traffic (e.g., application layer data traffic) that a user of mobile device 102 receives or transmits, but rather includes the signaling used to initialize and update an air interface for mobile device 102. Overhead load may be monitored, for example, by processing/scanning packets transmitted across an interface between controller 114 and base stations 112 (see FIG. 1). For example, deep packet inspection techniques may be used to determine the respective amounts of overhead load and bearer load. In some embodiments, network monitor 140 may determine overhead load by reviewing measurements made by other network components.

In step 306, network monitor 140 determines a bearer load based on application layer data traffic for a mobile device 102. For example, Network monitor 140 may determine the bearer load by measuring the load for a single mobile device 102, or may measure the bearer load for a large number of mobile devices 102 in aggregate. Bearer load indicates the amount of network resources that are used for the transmission and receipt of application layer data traffic (i.e., traffic having payload data directed to or from a core network element to an application or entity on mobile device 102), and in some embodiments, bearer load may be synonymous with data traffic. In some embodiments, network monitor 140 may determine bearer load by reviewing measurements made by other network components.

Upon acquiring the bearer load and overhead load information, network monitor 140 may forward the information to controller 114. In another embodiment, network monitor 140 may analyze the overhead load and the bearer load in relation to overall network, base station, and/or controller capacity, and may further generate a notification for controller 114 indicating whether the present idle timer values should be altered. For example, if the bearer load is below a first threshold, and yet the overhead load is above a second threshold, it may be desirable to increase a timer value in order to reduce the overhead load. Increasing the timer value ensures that a mobile device 102 has more time to utilize application layer communications before being downgraded to a lower RRC state. If the application layer traffic is consistent yet intermittent (e.g., multiple text messages sent over a short period), the number of transitions to and from an active RRC state will be reduced when the timer value is increased. Therefore the amount of overhead load will be reduced. By the same token, if bearer load is above a one threshold, and overhead load is below another threshold, it may be desirable to decrease a timer value to ensure that air interface resources are freed in a timely manner and not over-utilized by a single device.

In step 308, controller 114 generates an instruction to adjust the timer value based upon the overhead load and the bearer load to control (e.g., improve) the flow of network traffic. The instruction may be a command to adjust a timer value by a specified amount or percentage, or the instruction may be more complex. For example, the instruction may include parameters for adjusting multiple timer values at once, each timer being used for a different state transition. In a further example, the instruction may include parameters for adjusting timer values relating to a limited set of mobile devices 102. In this manner, mobile devices 102 that are high priority devices (e.g., smartphones with better service plans) will enjoy greater benefits from the changing timer values. In a still further example, the instruction may adjust timer values relating to a limited set of applications used by mobile devices 102 (e.g., specific email, text, or video applications), or may adjust timer values for a limited number of types of application layer data traffic (e.g., video traffic vs. voice traffic).

In step 310, controller 114 transmits the instruction to a network device. For example, controller 114 may transmit the instruction to a base station 112, and base station 112 may thereby modify a timer value based upon the instruction. In another embodiment, controller 114 may transmit the instruction to an internal component of controller 114 for execution.

Using method 300 of FIG. 3, RAN 110 dynamically adjusts to changing network traffic patterns by altering the timer values associated with RRC state transitions. In this manner, the provisioning of radio resources may be optimized dynamically by the network itself. This in turn ensures an effective use of wireless resources with minimal waste.

EXAMPLES

In the following examples, additional processes, systems, and methods are described in the context of a 3G UMTS-WCDMA implementation of a RAN. Assume, for this embodiment, that the RAN manages the radio communications of a variety of mobile devices.

Figure 4:
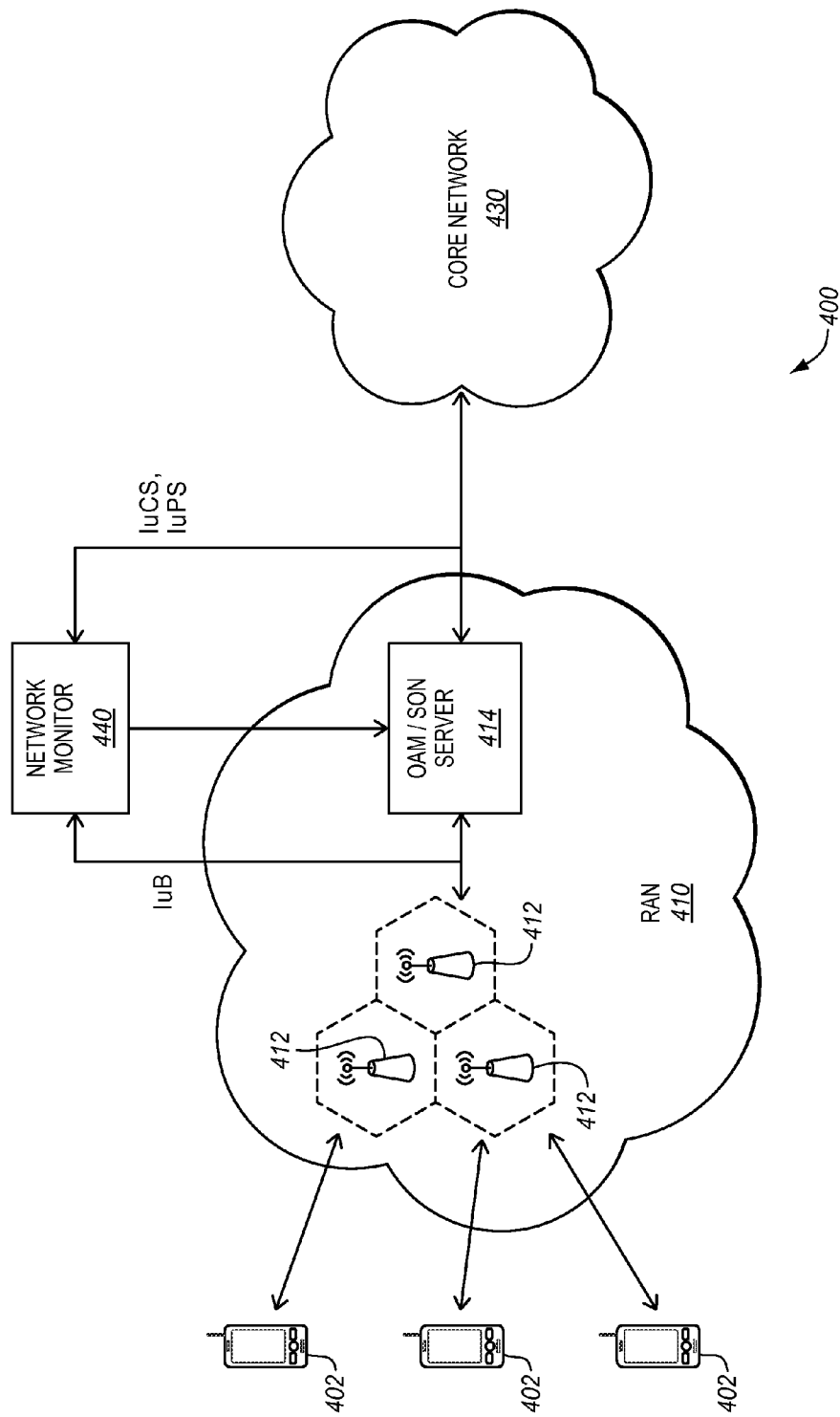
FIG. 4 is a block diagram illustrating an additional network architecture for an exemplary embodiment.

FIG. 4 is a block diagram illustrating an additional network architecture 400 for an exemplary embodiment. Network architecture 400 comprises an Organization & Management (OAM)/Self-Organizing Network (SON) server 414, managing the operations of various Node B's 412 as they communicate with various mobile devices 402. Each Node B 412 may initialize an air interface for one or more mobile devices 402. OAM/SON server 414 manages communications at Radio Access Network (RAN) 410, and may process and forward communications to and from core network 430. In this embodiment, Network monitor 440 may comprise an Alcatel-Lucent WIRELESS NETWORK GUARDIAN (WNG) brand system, model 9900. Network monitor 440 reviews communications between OAM/SON server 414 and Node B's 412 via an IuB interface, and further monitors network communications with a Serving GPRS Support Node (SGSN) via an IuPS interface, and monitors network communications with a Mobile Switching Center (MSC) via an IuCS interface. This data may be used by network monitor 440 to measure overhead load and bearer load at the network. Network monitor 440 processes the incoming data by scanning it on a packet-by-packet basis. Each packet header scanned by network monitor 440 identifies whether the packet is a network layer packet or an application layer packet. Individual packets in the network layer are flagged as relating to overhead load, while packets in the application layer are flagged as relating to bearer load. Based upon packet size, and the number of packets that relate to each of overhead load and bearer load, network monitor 440 determines whether network traffic is approaching the total wireless capacity of the network. Network monitor 440 further determines the ratio of overhead load to bearer load within the network. Network monitor 440 then reports this information to OAM/SON server 414. Based upon this information, OAM/SON server 414 may adjust timer values in order to enhance network performance.

In one example, mobile devices 402 utilize a large volume of network layer overhead-intensive applications (e.g., e-mails, text messages, mobile-to-mobile communications, etc.). However, the total application layer data traffic for RAN 410 is relatively low. Network monitor 440 determines that the overhead load is high, but the bearer load is within acceptable limits for RAN 410. Based on the information transmitted by network monitor 440, OAM/SON server 414 increases the RRC timer values. Because of this change, the overhead-intensive applications spend less time setting up and tearing down communications, resulting in reduced overhead load for OAM/SON server 414 to process.

In a further example, mobile devices 402 utilize a large number of bearer-intensive applications (e.g., peer-to-peer file transfer applications, video on-demand services, etc.). Network monitor 440 determines that bearer load is very high in the network, and that overhead load is relatively low. Because of this, network monitor 440 instructs OAM/SON server 414 to decrease timer values for RRC state transitions. Thus, less time is spent maintaining idle channels at RAN 410, and the air interface is used more efficiently by mobile devices 402.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A system comprising:
a controller operable to manage radio communications between a mobile device and a base station, the controller further operable to transition the mobile device between Radio Resource Control (RRC) states based upon application-layer data traffic for the mobile device and a timer value; and
a network monitor operable to determine an overhead load based on network-layer signaling events associated with at least one RRC transition for the mobile device, and to determine a bearer load based on the application-layer data traffic for the mobile device,
the controller further operable to adjust the timer value based upon the overhead load and the bearer load.

2. The system of claim 1, wherein:
the controller is further operable to adjust the timer value based upon a weighted function of the overhead load and the bearer load.

3. The system of claim 1 wherein:
the controller is operable to transmit network-layer signaling to the mobile device for transitioning the mobile device from one RRC state to another RRC state.

4. The system of claim 1, wherein:
the network monitor is operable to measure the overhead load and bearer load by parsing at least one packet communicated between the mobile device and the controller via the base station, and analyzing the contents of the at least one packet to identify whether the at least one packet relates to application-layer data traffic or to the network-layer signaling events associated with the at least one RRC transition.

5. The system of claim 1, wherein:
the controller is further operable to determine that the overhead load is above a first threshold value, to determine that the bearer load is below a second threshold value, and to increase the timer value based upon the overhead load being above the first threshold value and the bearer load being below the second threshold value.

6. The system of claim 1, wherein:
the controller comprises a Radio Network Controller (RNC), and the base station comprises a Node B of a RAN that comprises a Universal Mobile Telecommunications System (UMTS) Wideband Code Division Multiple Access (WCDMA) RAN, the RRC states comprise Dedicated Channel (CELL_DCH), Forward access channel (CELL_FACH), and Cell Paging channel (CELL_PCH) states, and the timer value dictates a maximum period of inactivity allowed by the RAN before transitioning the mobile device to a less active RRC state.

7. The system of claim 1, wherein:

whether the controller has allocated the mobile device a dedicated radio channel for data traffic, a shared radio channel for data traffic, or no radio channel for data traffic is based on the RRC state for the mobile device.

8. The system of claim 1, wherein:

the controller is further operable to determine that the overhead load is below a first threshold value, to determine that the bearer load is above a second threshold value, and to decrease the timer value based upon the overhead load being below the first threshold value and the bearer load being above the second threshold value.

9. The system of claim 1, wherein:

the network monitor is further operable to monitor a plurality of mobile devices, to determine an overhead load and a bearer load for each mobile device, to aggregate the overhead loads, to aggregate the bearer loads, and to adjust the timer value based on the aggregated overhead and bearer loads.

10. The system of claim 1, wherein:

the controller is further operable to adjust a plurality of timer values based upon the overhead load and the bearer load to improve the flow of network traffic, each timer value associated with a transition between a different pair of RRC states.

11. A method comprising:

managing radio communications between a mobile device and a base station, including transitioning the mobile device between Radio Resource Control (RRC) states based upon application-layer data traffic for the mobile device and a timer value;

determining an overhead load based on network-layer signaling events associated with at least one RRC transition for the mobile device;

determining a bearer load based on the application-layer data traffic for the mobile device;

generating an instruction to adjust the timer value based upon the overhead load and the bearer load; and transmitting the instruction to a network device.

12. The method of claim 11, wherein the generating comprises:

generating an instruction to adjust the timer value based upon a weighted function of the overhead load and the bearer load.

13. The method of claim 11, wherein the measuring a bearer load and measuring an overhead load comprises:

measuring the overhead load and bearer load by parsing at least one packet communicated between the mobile device and the base station; and analyzing the contents of the at least one packet to identify whether the at least one packet relates to application-layer data traffic or to the network-layer signaling events associated with the at least one RRC transition.

14. The method of claim 11, further comprising:

determining that the overhead load is above a first threshold value;

determining that the bearer load is below a second threshold value; and generating an instruction to increase the timer value based upon the overhead load being above the first threshold value and the bearer load being below the second threshold value.

15. The method of claim 11, wherein:

the base station comprises a Node B of a RAN that comprises a Universal Mobile Telecommunications System (UMTS) Wideband Code Division Multiple Access (WCDMA) RAN, the RRC states comprise Dedicated Channel (CELL_DCH), Forward access channel (CELL_FACH), and Cell Paging channel (CELL_PCH) states, and the timer value dictates a maximum period of inactivity allowed by the RAN before transitioning the mobile device to a less active RRC state.

16. The method of claim 11, wherein the managing radio communications comprises:

allocating the mobile device a dedicated radio channel for data traffic, a shared radio channel for data traffic, or no radio channel for data traffic based on the RRC state for the mobile device.

17. The method of claim 11, further comprising:

determining that the overhead load is below a first threshold value;

determining that the bearer load is above a second threshold value; and generating an instruction to decrease the timer value based upon the overhead load being below the first threshold value and the bearer load being above the second threshold value.

18. The method of claim 11, further comprising:

monitoring a plurality of mobile devices;

determining an overhead load and a bearer load for each mobile device;

aggregating the overhead loads;

aggregating the bearer loads; and adjusting the timer value based on the aggregated overhead and bearer loads.

19. The method of claim 11, further comprising:

adjusting a plurality of timer values based upon the overhead load and the bearer load to improve the flow of traffic, each timer value associated with a transition between a different pair of RRC states.

20. A non-transitory computer readable medium embodying programmed instructions which, when executed by a processor, are operable for performing a method comprising:

managing radio communications between a mobile device and a base station, including transitioning the mobile device between Radio Resource Control (RRC) states based upon application-layer data traffic for the mobile device and a timer value;

determining an overhead load based on network-layer signaling events generated for RRC transitions for the mobile device;

determining a bearer load based on the application-layer data traffic for the mobile device;

generating an instruction to adjust the timer value based upon the overhead load and the bearer load; and transmitting the instruction to a network device.

* * * * *